March 9, 1965 O. C. OLSEN ETAL 3,172,609
APPARATUS FOR DISINTEGRATING AGGREGATES OF SOLID MATERIAL
Original Filed Nov. 3, 1960 4 Sheets-Sheet 1
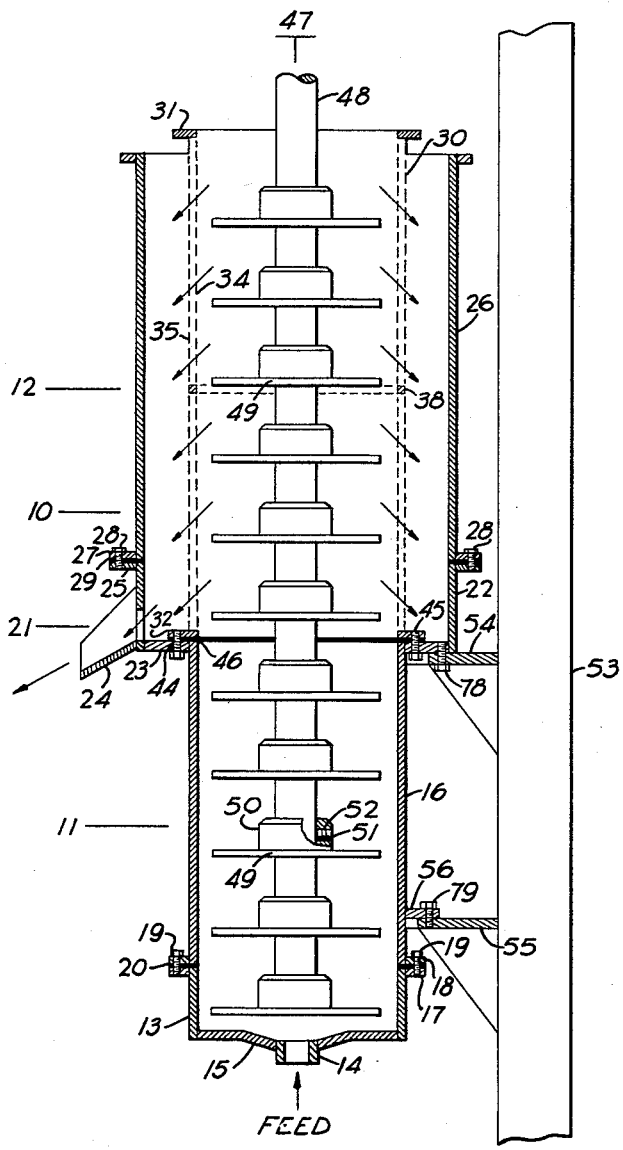
FIG_1
INVENTORS
ORRIE C. OLSEN
LLOYD M. HOUSH
BY March 9, 1965  O. C. OLSEN ETAL  3,172,609
APPARATUS FOR DISINTEGRATING AGGREGATES OF SOLID MATERIAL
Original Filed Nov. 3, 1960  4 Sheets-Sheet 2
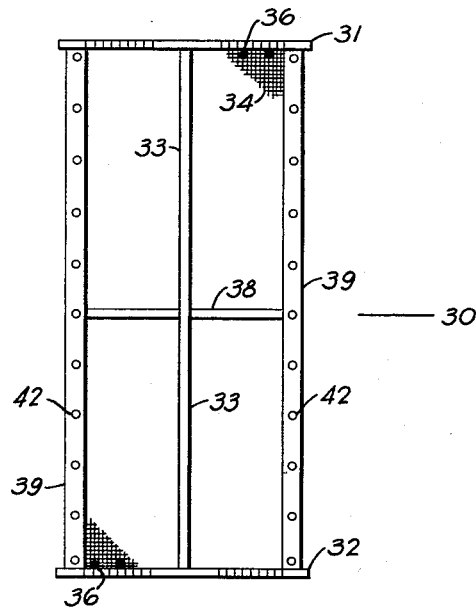
FIG_2
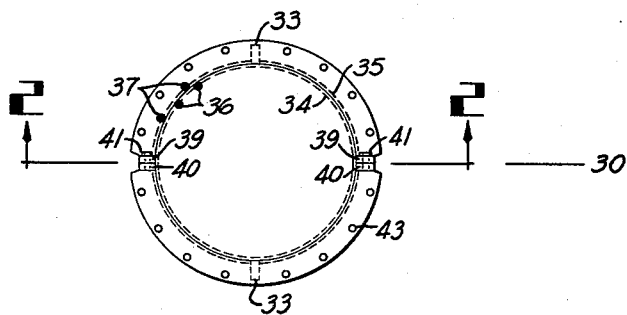
FIG_3
INVENTOR.
ORRIE C. OLSEN
LLOYD M. HOUSH
BY

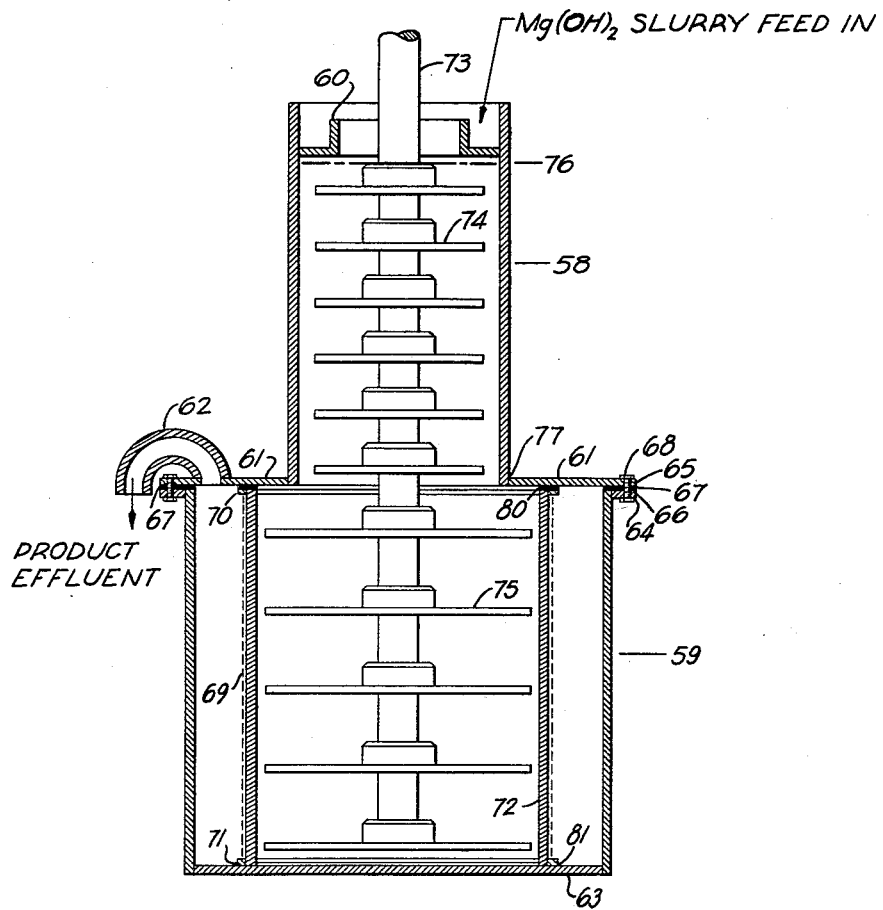
FIG_4

March 9, 1965   O. C. OLSEN ETAL   3,172,609
APPARATUS FOR DISINTEGRATING AGGREGATES OF SOLID MATERIAL
Original Filed Nov. 3, 1960   4 Sheets-Sheet 4
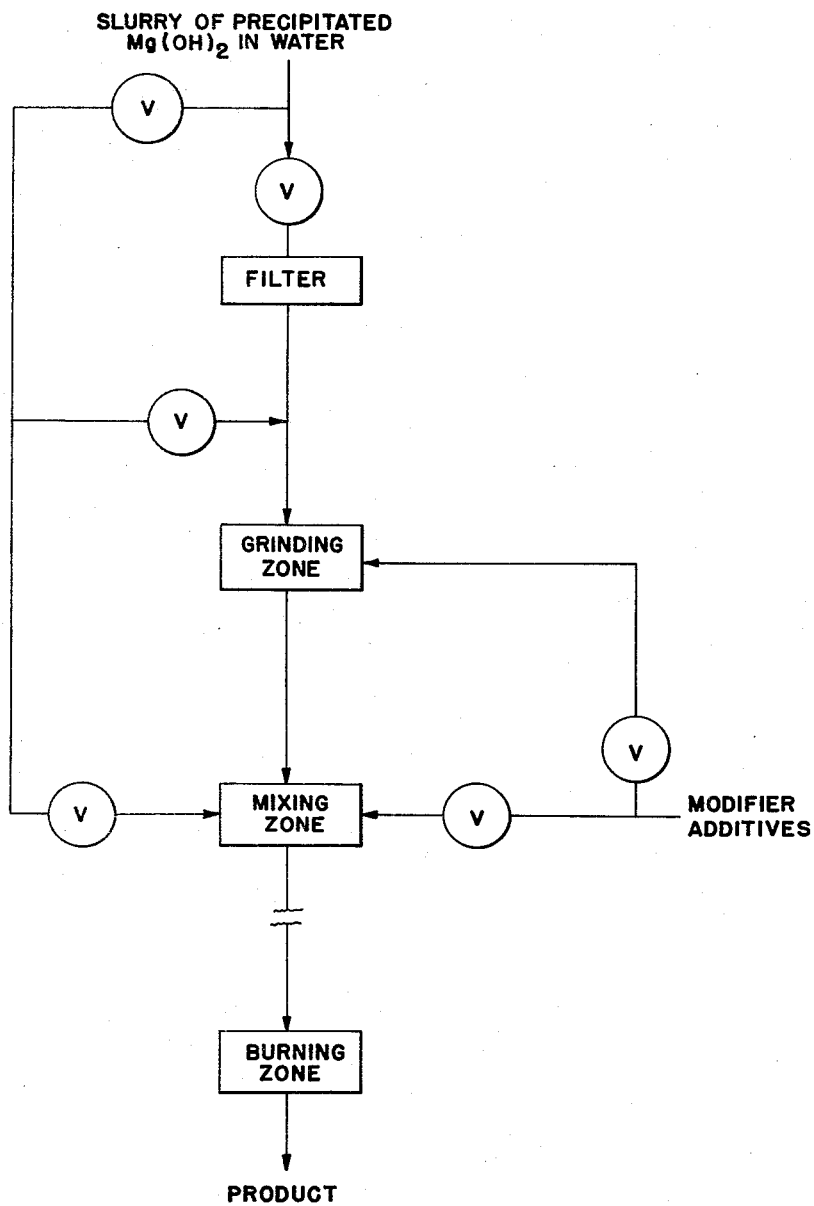
FIG_5
INVENTOR.
ORRIE C. OLSEN
LLOYD M. HOUSH

United States Patent Office 3,172,609
Patented Mar. 9, 1965

3,172,609
APPARATUS FOR DISINTEGRATING AGGREGATES OF SOLID MATERIAL
Orrie C. Olsen, Los Gatos, and Lloyd M. Housh, Santa Clara, Calif., assignors to Kaiser Aluminum & Chemical Corporation, Oakland, Calif., a corporation of Delaware
Original application Nov. 3, 1960, Ser. No. 67,054. Divided and this application Feb. 8, 1963, Ser. No. 264,468
4 Claims. (Cl. 241—69)

This invention relates to a process for improving the firing and sinterability of a finely divided magnesium compound such as the hydroxide, to form dense, fired agglomerates; and to a device for milling such magnesium compound to improve its sinterability. The present application is a division of application Serial No. 67,054 filed November 3, 1960.

For some purposes, and more particularly for the production of refractory products, it is desired in firing magnesium hydroxide or the like to form magnesium oxide particles, that the ultimate fired product be recovered in the form of dense agglomerates or grains of substantial size. It has been the experience in this art that upon firing, magnesium hydroxide which decomposes to form magnesium oxide and a gaseous product of decomposition at the temperatures of firing, results in rather finely divided magnesium oxide where the starting materials are of high purity, unless the firing temperatures are extremely high, for example, above 2000° C. As will be understood, the attainment of such high firing temperatures has required the use of shaft kilns or the like and such firing temperatures are not normally attained in the operation of the usual rotary kiln where magnesium products are burned in commerce in the most expeditious and economical manner. The art has overcome the disadvantage of high firing temperatures by adding, among the older processes, considerable amounts of fluxes, for example, from 5% to 15% of iron oxide, alumina, and silica or any combination of these materials, to form a dense, fired magnesium oxide which has been known as deadburned magnesite. Subsequently, it was discovered that sintering could be improved by adding small quantities of crystallization-promoting agents, such as chromic acid or others.

However, it will be evident that the production of a high purity periclase grain or magnesia grain is not possible where from 5% to 15% of fluxing agents are added in order to produce a deadburned and well sintered product. The later developments wherein small or substantially catalytic amounts of sintering aids or crystallization promoters have been added result in the production of high purity grain, which is well sintered and of low porosity. However, with some starting materials where not all of the starting material is very finely divided but where there may be considerable admixture of larger particles of the hydroxide, or where the starting material is a precipitated product in which the individual hydroxide crystals are clumped together to form a crystal aggregate of larger effective particle size, the small or catalytic amounts of crystallizing agents may not suffice to sinter to products of adequately low porosity.

According to the present invention, precipitated magnesium hydroxide is treated by a method which ensures the production of a low porosity fired or sintered periclase, if desired, with the addition of a crystallization promoter or sintering aid, upon sintering at temperature attainable in a rotary kiln.

According to the present invention, a magnesium compound which forms magnesium oxide upon firing, such as precipitated magnesium hydroxide, is treated by agitation in an agitating zone, in the presence of water, with a finely divided solid grinding medium to reduce the magnesium compound to very finely divided form, the slurry of magnesium compound in water which is so produced is then separated from the grinding medium and is dried and can be fired to form a high purity magnesium oxide of well sintered and low porosity characteristics. Crystal aggregates and flocs are broken down in this manner of operation.

As a further variation of the present invention, sintering agents or crystallization promoters can be admixed with the starting magnesium hydroxide prior to introduction into the milling or grinding zone, in order to secure maximum dispersion of such agents in the minimum of time and with the greatest efficiency. Such sintering aids or agents can include small amounts of finely divided silica, such as volatilized silica, or chromic acid, chromium oxide or other chromium compound, aluminum compounds, vanadium compounds or other desired agents, or mixtures of such agents with each other. Such additives may be incorporated in very small amounts, for example, from about 0.05% to about 5%, calculated as the oxide on the fired basis, or larger amounts can be incorporated, if desired. Particularly, another metal oxide or metal oxides can be added in such amount that the final fired product contains at least 50% free MgO. The dispersion of such material in the magnesium hydroxide is rapid and efficient and ensures the most complete action or reaction upon subsequent firing. In another variation an agglomerated solid sintering aid, especially volatilized silica, is milled separately according to the invention, to break down agglomerates, and is then admixed with magnesium hydroxide slurry, for instance, in a pug mill.

Devices suitable for carrying out the process of the invention and a typical flowsheet incorporating the method thereof are shown in the accompanying drawings wherein FIGURE 1 shows a vertical sectional view of a suitable agitating device;
FIGURE 2 is a vertical sectional view of one embodiment of screen construction;
FIGURE 3 is a bottom plan view of FIGURE 2;
FIGURE 4 shows another suitable agitating device; and
FIGURE 5 shows a typical flowsheet of some variants of the process of this invention.

In the present process there is utilized as starting material any magnesium compound which yields magnesium oxide upon firing to decompose and which is in subdivided, that is, comminuted or flocculent, state. The invention will be described with respect to the treatment of precipitated magnesium hydroxide, especially as recovered from concentrated Mg salt solutions. Magnesium hydroxide, as is known, is obtained by reacting magnesium salt solution in water with an alkaline reactant such as caustic soda, lime, calcium hydroxide, etc. For example, in one process a dilute solution such as sea water is reacted with calcined dolomite to form magnesium hydroxide precipitate, and calcium chloride which remains in solution, and the precipitate is separately recovered as a water slurry. In another mode of procedure, a bittern or a subterranean brine which contains a higher concentration of $MgCl_2$ is reacted with caustic soda, lime or calcined dolomite to form $Mg(OH)_2$ which is recovered as a slurry in water. The slurries are washed with fresh water and can, if desired, be dewatered by filtration, centrifuging or other means.

The precipitated $Mg(OH)_2$ so recovered is in quite small ultimate particle size but the particles flocculate in precipitation and the flocs are loose or porous. Upon firing, it has been found that many voids remain, and the fired product still exhibits lower density or higher porosity than is desirable, particularly in a refractory grain material. It has now been found that greatly improved sintering is obtained by agitating these flocculent precipitates in a restricted zone with a quantity of finely divided solid grinding medium, and then separately recovering the treated precipitate and firing the same. The sintering to improved, well-sintered agglomerates of low porosity proceeds more rapidly than when firing untreated precipitate of the same type. Also, better dispersion of a sintering aid is effected by the present method and this reduces the incidence of voids in the material to produce lower porosity fired products.

The grinding medium useful in this invention is suitably of particle size passing 4 mesh and retained on 40 mesh. One useful medium is a hard, non-friable silica sand, such as Ottawa sand, preferably of particle size passing 20 mesh and retained on 30 mesh screens. This sand is of high purity, containing at least about 99% $SiO_2$, and it is of rounded particle shape, which is desirable for the present utilization. Other finely divided solids, of the aforementioned particle sizes, of rounded shapes, and harder than magnesium hydroxide are also useful in this invention. For instance, periclase grains of passing 4 mesh and retained on 28 mesh have been found useful herein. Magnesium hydroxide has a hardness of 2.5, whereas periclase has a hardness of 5.5 to 6.0, and quartz or sand, of about 7, and corundum, of 9. All of these harder materials are useful as grinding media herein. The grinding medium is used in an amount of from 10% to 50% of the total volume of admixture, preferably from 15% to 40% thereof.

The drawings show devices suitable for carrying out the process of this invention, and in FIGS. 1 to 3 like numerals indicate like parts. In FIGURE 1 there is shown the general arrangement of such a tubular milling device 10 made of any desired material, preferably ferrous metal, and which is composed of a lower mill body 11 and an upper, tubular launder or screen portion 12. The lower, tubular mill body includes cylindrical base 13 having a feed pipe 14 to conduct slurry into the device and suitably, but not necessarily, disposed about at the center of bottom plate 15 of the base 13. It will be understood that flow of feed slurry into the device is stopped when desired, for example, by a valve (not shown) in pipe 14. The upper portion of milling element or body 11 is a tubular shell 16. Shell 16 is joined to base 13 by flanges 17 and 18 which are suitably connected by bolts 19 or in any other desired manner and between which is disposed gasket 20 of, for example, neoprene.

Disposed at the top of shell 16 and in sealed arrangement therewith is launder device or element 12, which is of enlarged diameter with respect to shell 16. Base 21 of launder 12 is composed of cylindrical or tubular shell 22 having bottom flange or annular plate 23 which in this embodiment is integral with shell 16 and with shell 22. Disposed adjacent the bottom of shell 22 is outlet 24 for withdrawal of the separated product slurry. At the top of shell 22 is flange 25. Disposed above launder base shell 22 is tube 26 having flange 27 at its lower end, and tube 26, which is preferably of the same diameter as shell 22, is attached to the latter by bolts 28 which pass through flanges 25 and 27. Any desired type of gasket 29 is disposed between flanges 25 and 27.

Within launder 12 is placed tubular screen assembly 30 including upper flange 31, lower flange 32, ring 38, bars 33, side flanges as will be later described, working screen 34 and protective screen 35. The screens are each soldered to flanges 31 and 32 as indicated in FIGURES 2 and 3 at 36 and 37. Inner, or the so-called "working" screen 34 is of such mesh size as will retain the sand used in the grinding zone. For instance, where the finest particles of sand used are retained on a 40 mesh screen, the working screen openings will not exceed 40 mesh. The outer, or so-called "protective" screen 35 is disposed closely adjacent inner screen 34 but is of coarser size and stronger construction to withstand handling and to protect inner screen 34. Protective screen 35 is not essential to the operation of this invention but is a very useful adjunct to the equipment. The screens are made of any desired suitable material, but it is economical and satisfactory to employ ferrous metal screens. The screens are placed over the supporting cage of circular cross-section and made up of flanges 31 and 32, ring 38 and bars 33, and are in this embodiment silver-soldered to the flanges. Ring 38 and flanges 31 and 32 are each suitably made in two parts; and vertical flanges or strips 39 are provided at each end of one part and, 40, at each end of the other part. When assembled, each pair of vertical flanges 39 and 40 abut and are then connected with bolts 41 through registering holes 42 in each flange, to form a tubular screen assembly. Bottom flange 32 is provided with holes 43 and bottom plate 23 is also provided with holes 44 which register with holes 43. When the screen assembly is set in place, bolts 45 connect the base of the assembly 30 to the base of the launder. A gasket 46, suitably of neoprene, and also having registering holes, is interposed between flange 32 and base plate 23 to effect sealing relationship therebetween.

The disk assembly 47 is disposed vertically and along the central axis of the screen and shell assemblies. The disk assembly in this embodiment is made up of a shaft 48 upon which are affixed a number of substantially flat solid metal disks 49 of uniform diameter. Each disk is provided at the central portion with a collar 50 which is tapped, as at 51, and the disk is fixed to the shaft by screws 52. The disks are of a diameter slightly less than that of shell 16. For instance, where shell 16 is twelve inches in diameter, each disk is of about 10-inch diameter for optimum results. In the embodiment according to FIGURE 1, for treating magnesium hydroxide slurries there is advantageously provided a screen section which is about twice as long as the grinding zone or section, both being of the same diameter, and to dispose about two-thirds, or a major portion, of the disks in the screening zone. The upper end of shaft 48 is connected to a source of power, not shown, whereby it is rotated during the grinding operation.

The device 10 is supported in any desired manner. One suitable means is an iron frame piece 53 having a bracket 54 upon which the launder plate 23 rests and to which it is connected by bolts 78; and a lower arm 55 connected by bolts 79 to an arcuate supporting bracket 56 which partially surrounds and supports or steadies shell 16. Suitably, a motor which drives shaft 48 is also affixed to iron frame 53 at a higher location.

As one example of carrying out of the present invention using the device shown in the FIGURES 1 through 3, and proceeding generally according to the flowsheet of FIGURE 5, a slurry of precipitated magnesium hydroxide in water, of about 45% by weight solids content, is introduced through pipe 14 into base 13 and so upwardly into and through device 10. Prior to introducing this slurry, it is convenient to place sand of the above description in the device with an amount of water and the slurry is then fed in while rotating shaft 48 and disks 49. The slurry passes upwardly into screen section 30 and the product flows out through the screens 34 and 35 and leaves the device at 24. Screen 34 prevents outflow of the sand, however, which is then available for work on further amounts of slurry flowing through the device. If desired, an additive such as very finely divided silica, chromic acid, iron compound or other, is added to the magnesium hydroxide slurry prior to introduction into the grinding device or in a mixing zone, and a very efficient interdispersion of these components is then obtained. Aggregates, including crystal aggregates, and flocs of magnesium hydroxide precipitate are very rapidly broken down, and a large amount of finely divided Mg(OH)$_2$ is produced.

In FIGURE 4 there is shown another device according to the present invention and suitable for carrying out the process of the present invention. In this device, the incoming slurry of material to be ground or dispersed is fed in at the top of the device, suitably into a distributing weir 60 within mill shell 58, and milled, ground or dispersed product is taken off from the screening zone at the base of the device. The device, made of iron and indicated generally at 57, is composed of two tubular shell portions, upper or mill portion 58 and base or screen portion 59. The milling tube 58 has weir 60 disposed adjacent its top edge at the inner surface thereof to facilitate uniform feed of incoming material to the milling zone. Tube 58 has integral annular flange 61 at its lower end; and disposed in flange 61, preferably adjacent its outer edge, is outlet pipe 62 for removal of milled slurry.

The tubular base portion or element 59 is closed at the bottom by plate 63, and at its top edge is disposed exterior annular flange 64. The outer rim of flanges 61 and 64 are provided with a series of registering holes 65 and 66, and when assembled there is also provided a suitable sealing gasket 67 likewise having holes registering with holes 65 and 66. Thereby upper mill shell 58 is connected to lower screen shell 59 in sealing relationship by means of bolts 68. In this embodiment the height of milling zone 58 to the upper slurry level when filled and operating is substantially the same as the height of screen zone 59. The diameter of the screen itself is substantially 1.5 times the diameter of the milling zone, however, and this provides optimum milling and screening action with a slurry of magnesium hydroxide of the type precipitated from inland brines.

Disposed within screen shell 59 is tubular screen 69 which is of such size as will retain the grinding medium, such as sand, and permit the ground and agitated slurry to flow through as explained elsewhere herein. This screen is mounted on a supporting cage made up of upper ring 70 and lower ring 71 and upright stiffener rods 72, the screen being welded to the upper and lower rings. Resilient sealing gaskets 80 and 81, suitably of neoprene, are disposed, respectively, between ring 70 and flange 61 and between ring 71 and plate 63 to seal the cage to the flange 61 and plate 63 and prevent loss of grinding medium. It will be understood that a protective screen can be used in this embodiment also, if desired.

A vertical shaft 73 is disposed along the central axis of device 57 and fixedly attached thereto are disks 74 in the upper or mill element and larger disks 75 in the lower or screening portion of the device. The disks preferably are of diameters about two inches less than the diameters of the adjacent wall 58 and screen 69, respectively. When the device is in operation shaft 73 and disks 74 and 75 are rotated by any desired source of power, such as an electric motor, not shown.

In the device of this invention it is preferred that the area of the screen be at least 1.5 times the area of the mill, or pre-mill, shell, taken from the level of the charge, e.g. at 76 of FIG. 4, to the other end of the mill zone and entry to the screening zone, for example to 77 of FIG. 4. Preferably, this ratio is from 1.5 to 2:1, for treating precipitated magnesium hydroxide slurries as recovered from the brines. Somewhat higher ratios can be used but will be increasingly expensive and less economical.

The device described herein is especially useful in treating thixotropic slurries of magnesium hydroxide of the type precipitated from concentrated solutions of magnesium salts, such as inland or subterranean brines, to break down flocs or crystal aggregates and, if desired, to disperse sintering aids therethrough. The device effects this action without any apparent damage to the crystals themselves. It is a particular advantage of a device such as shown in FIG. 4, that the increased diameter of the disks provides greater peripheral speed for the same shaft speed, with increased shearing action, and effectuation of greater driving force through the screen. In the device of this invention it is preferred that at least a major portion of the screen be kept wet, or preferably immersed in the slurry, at all times and to this end the offtake is suitably located. For instance, the offtake is adjacent the upper edge of the screen in FIG. 4; but is at any desired location when the slurry is fed from below as in FIG. 1.

It is one advantage of the present invention that precipitated flocs of Mg(OH)$_2$ are broken down in a very rapid and efficient manner. It is a further advantage that the grinding action of fine sand particles is utilized without contamination of the magnesium hydroxide and the product recovered is of high purity. It is a special advantage that the milling or grinding procedure breaks down the clumps or crystal flocs without any apparent damage to or breakage of the crystals themselves; and apparently this grinding process destroys only the weaker bonds which hold the crystals together in clumps. It is a further advantage that the magnesium hydroxide which has been treated in this manner filters to a high solids cake, and in one series of experiments such precipitate was filtered to form a filter cake containing 80% solids after four passes through such grinding device. A further advantage is the very efficient interdispersion of magnesium hydroxide with modifying additive or sintering aid.

EXAMPLE 1

As an example of the mode of carrying out the method of this invention, magnesium hydroxide, which has been made by reacting an inland brine containing about 3.4% Mg ion, calculated as MgCl$_2$, with hydrated, calcined dolomite to precipitate Mg(OH)$_2$ and then filtering and washing, is recovered as a slurry in water, containing about 45 weight percent solids. A portion I of this slurry is burned at about 1670 to 1690° C., to form periclase, in the usual way. Another portion II is fed to a grinding device as shown in FIGURE 1 and treated as described above, using Ottawa sand passing 20 and retained on 30 mesh, as grinding medium and grinding in the mill for 90 seconds' retention time. The thin slurry recovered at 24 is burned at the same temperature. Both batches are burned for one hour. The bulk porosity of a sample of portion II is found to average about 14% less than that of portion I. The milled slurry in these tests differs from the starting material also in that 18% of the particles, after milling, are less than 1 micron in diameter and 43% are less than 10 microns; whereas in the starting material only about 2% are less than 1 micron and about 28% are less than 10 microns. The finer particle size facilitates sintering, even without added sintering aids. Also, there is substantially no contamination of the Mg(OH)$_2$ by the sand grinding medium.

EXAMPLE 2

In another series of tests an amount of magnesium hydroxide precipitated from a similar inland brine is divided into two portions, batches A and B. To each portion is added chromic acid CrO$_3$, in an amount to provide about 0.25% Cr$_2$O$_3$, calculated on the fired basis. There is also admixed with each portion 1.5% volatilized silica, on the fired basis. Batch A, with the named additives, is thoroughly mixed by hand agitation and is fired at 1670 to 1690° C. for one hour. Batch B is fed into a device as shown in FIG. 1, which has been charged with Ottawa sand passing 20 mesh and retained on 30 mesh and amounting to about 38% of the total liquid-solids volume in the mixer, and is agitated with the sand, total retention time of the slurry mix being 15 seconds. The slurry admixture recovered at 24 is also fired for one hour at 1670–1690° C. The porosity of the grain material from batch A is found to be 12% by volume, and of that from batch B, 6% by volume. The silica content of the grain produced is not increased by take-up of silica from the sand. That is to say, there is substantially no contamination of the $Mg(OH)_2$ by the sand grinding medium; and this has been found with all of the grinding tests on $Mg(OH)_2$ using sand. In a series of tests similar to the run on batches A and B, except that the starting Mg material is magnesium hydroxide precipitated from sea water (a dilute Mg salt solution) and all other conditions being the same, the porosity of the grains of the fired mix, treated according to this invention, is only 3% by volume whereas that of the hand-mixed material (fired) is 5%.

EXAMPLE 3

In a further series of tests precipitate magnesium hydroxide of the type used in Example 2 is divided into two batches, C and D. To each batch there are added chromic acid, $CrO_3$, in an amount to provide 0.25% $Cr_2O_3$ on the fired basis, and 1.5% volatilized silica. Batch C and additives are thoroughly mixed by hand agitation and the mix fired as in Example 2. Batch D is charged to a mixer according to FIGURE 1 with about 34% by volume of periclase grain material passing 6 and retained on 28 mesh, of which 5% is passing 6 and retained on 8 mesh, and substantially 95% is passing 20 and retained on 28 mesh; and is treated in the mixer for 75 seconds retention time, the milled slurry recovered and fired as in Example 2. The porosity of the fired grain material C is 15.4%; and that from D, 11.0%.

Although the above examples and specific description have been given with respect to magnesium hydroxide, it will be understood that other precipitated magnesium compounds, for example, magnesium carbonate, can be treated and improved by the present invention. The entire feed to the kiln can be treated according to this invention; or, alternatively, only a portion can be treated and then mixed with untreated precipitate to feed to the kiln and considerable improvement of product will be obtained. The milled product can be fed to the burning zone; or it can be dried and, if desired, compacted and then burned. It will be understood that Mg hydroxide can be charged in the form of a filter cake or a a slurry in water. In the case of $Mg(OH)_2$ precipitated from more dilute solutions, such as sea water, special handling of the slurry may be required, such as further dilution, due to the dilatancy at high shear rates which is exhibited by some of these precipitates. In firing the milled product to form well-sintered periclase grain material for use in making refractory products to be utilized in lining high temperature metallurgical furnaces, it is preferred to fire at a temperature of at least 1650° C., and still better sintering is effected at 1670° to 1850° C., or higher. The material can be suitably fired in a rotary furnace. Milling times are selected according to the results desired and are usually from about 15 seconds to 3 minutes, precipitated $Mg(OH)_2$ alone, without additives usually employing 1 to 2 minutes time. In preparing the feed to the mill the amount of suspending water is not critical but sufficient water is used to provide an easily flowable mass. Very large amounts of water, it will be understood, are uneconomical and unnecessary.

Percentages herein are by weight except as otherwise indicated, the porosities and the proportions of grinding medium in the operation being by volume. Porosities are determined by the well-known Modified Seil method, that is, by displacement of mercury, using a pressure of not over 2 mm. Screen sizes given herein are Tyler screen sizes as defined on page 1719 of Chemical Engineers' Handbook, John H. Perry, Editor-in-Chief, second edition, 1941, McGraw-Hill Book Company. Where chemical analyses are given, the constituents are expressed in many instances as the simple oxides, e.g. $CaO$, $SiO_2$, as is the usual procedure in this art, although such constituents may actually be present in combination, partly or wholly, with other constituents of the material.

The terms "mill element or portion" and "screen element or portion" are terms conveniently designating the elements, or zones, wherein, respectively, milling is done exclusively and screening is effected, but it will be understood that further milling is effected in the screening portion, disks and grinding medium being disposed therein. In another variant of the device shown in FIG. 1, the top portion is covered and the top of the screen element sealed from the outer or launder portion, and higher pressure is employed to pump feed in and material through the device at a still faster rate. Preferably, the working screen used in the device of this invention is a slotted steel screen.

The term "volatilized silica" is intended to mean very finely divided, amorphous silica recovered from the gases issuing from a zone wherein silica is reduced, e.g. by reaction with carbon, and such recovered silica is of an ultimate particle size predominantly below one micron in diameter. It will be understood that there can also be used other finely divided silicas known to the art as sintering aids, e.g. diatomaceous earth, precipitated silica and the like. It has been found suitable to employ as feed to the device water slurries of magnesium hydroxide containing from 30% to 58% by weight solids. In the specification and claims, the term "crystal aggregate" intended to mean an aggregate of ultimate particles of precipitated $$Mg(OH)_2$$

held together by chemical bonding forces; and the term "floc" is intended to mean a larger particle made up of a mass of such crystal aggregate electrostatically bonded together in the known manner. The terms "aggregate" or "agglomerate" are intended to induce both such crystal aggregates and flocs.

Having now described the invention, what is claimed is:

1. An apparatus for disintegrating aggregates of precipitated magnesium hydroxide which comprises a tubular device having an inlet adjacent a milling zone and an outlet adjacent a screening zone, said device comprising a tubular milling element and a screening element, said screening element including a shell and a tubular screen disposed therein, the peripheral area of said screen being from 1.5 to 2 times the peripheral area of said milling element, a rotatable shaft extending vertically through said device and substantially centrally axially thereof, and a plurality of flat, solid, circular disks fixedly disposed on said shaft in spaced relation to each other.

2. An apparatus as in claim 1 wherein said disks are about 2 inches in diameter less than the diameter of the tubular device wherein said disks are disposed.

3. An apparatus for disintegrating aggregates of precipitated magnesium hydroxide and dispersing finely divided solids therethrough which comprises a vertical tubular device having an inlet at the top and an outlet disposed below, said device comprising an upper tubular milling element and a lower tubular screening element, said milling element and said screening element being of substantially the same length, said screening element comprising a shell and a tubular screen disposed therein, said screen having a diameter approximately 1.5 times the diameter of said upper milling element, a rotatable shaft disposed vertically in said device and substantially along the major portion of the central axis thereof, and a plurality of flat, solid, circular disks affixed to said shaft and spaced from each other.

4. Apparatus as in claim 3 wherein said disks are of diameters about two inches less than the diameters of the tubular devices wherein they are disposed.

No references cited.